United States Patent [19]

Fischer, Jr.

[11] Patent Number: 4,965,879
[45] Date of Patent: Oct. 23, 1990

[54] X-WING FLY-BY-WIRE VEHICLE MANAGEMENT SYSTEM

[75] Inventor: William C. Fischer, Jr., Monroe, Conn.

[73] Assignee: United Technologies Corporation, Hartford, Conn.

[21] Appl. No.: 257,474

[22] Filed: Oct. 13, 1988

[51] Int. Cl.⁵ ............................................. G06F 15/50
[52] U.S. Cl. ............................ 364/424.01; 244/17.11; 318/564
[58] Field of Search ........... 364/439, 186, 187, 424.06, 364/424.01; 244/17.11, 17.13; 318/564, 565; 371/11

[56] References Cited

U.S. PATENT DOCUMENTS

| | | | |
|---|---|---|---|
| 4,015,246 | 3/1977 | Hopkins, Jr. et al. | 371/10 |
| 4,115,847 | 9/1978 | Osder et al. | 364/187 |
| 4,270,168 | 5/1981 | Murphy et al. | 364/200 |
| 4,294,162 | 10/1981 | Fowler et al. | 91/434 |
| 4,472,780 | 9/1984 | Chenoweth et al. | 364/434 |
| 4,493,612 | 1/1985 | D'Anna | 416/20 R |
| 4,507,050 | 3/1985 | Jeffery et al. | 416/90 A |
| 4,534,702 | 8/1985 | Johnson, Jr. et al. | 416/20 R |
| 4,564,908 | 1/1986 | Clelford et al. | 364/433 |
| 4,573,871 | 3/1986 | Krauss et al. | 416/20 R |
| 4,583,704 | 4/1986 | Krauss et al. | 244/17.11 |
| 4,594,537 | 6/1986 | Arifian et al. | 318/564 |
| 4,596,512 | 6/1986 | Krauss et al. | 416/42 |
| 4,626,171 | 12/1985 | Carter, Sr. et al. | 416/90 A |
| 4,634,110 | 1/1987 | Julich et al. | 371/11 |
| 4,649,484 | 3/1987 | Herzog et al. | 364/187 |
| 4,658,359 | 4/1987 | Palatucci et al. | 364/424.06 |
| 4,678,401 | 7/1987 | Bradford et al. | 416/32 |
| 4,771,427 | 9/1988 | Tulpule et al. | 375/12 |
| 4,774,709 | 9/1988 | Tulpule et al. | 371/11 |
| 4,890,284 | 12/1989 | Murphy et al. | 381/9.1 |

Primary Examiner—Thomas G. Black

[57] ABSTRACT

A complete, computer based, vehicle management system (VMS) for X-Wing aircraft using digital "fly-by-wire" technology controlling many subsystems and providing functions beyond the classical aircraft flight control system. The vehicle management system receives input signals from a multiplicity of sensors and provides commands to a large number of actuators controlling many subsystems. The VMS includes—segregating flight critical and mission critical factors and providing a greater level of back-up or redundancy for the former; centralizing the computation of functions utilized by several subsystems (e.g. air data, rotor speed, etc.); integrating the control of the flight control functions, the compressor control, the rotor conversion control, vibration alleviation by higher harmonic control, engine power anticipation and self-test, all in the same flight control computer (FCC) hardware units. The VMS uses equivalent redundancy techniques to attain quadruple equivalency levels; includes alternate modes of operation and recovery means to back-up any functions which fail; and uses back-up control software for software redundancy.

22 Claims, 12 Drawing Sheets

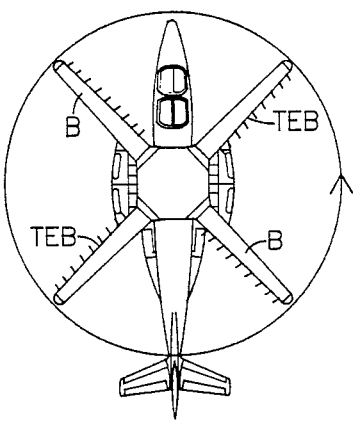
FIG.1A RW
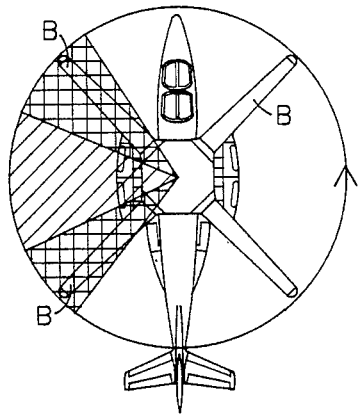
FIG.1B CV
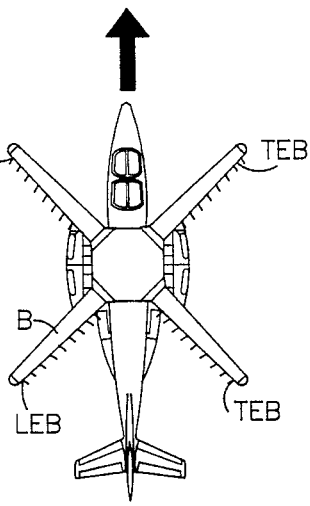
FIG.1C SR

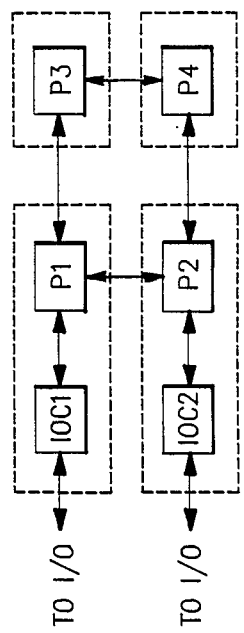
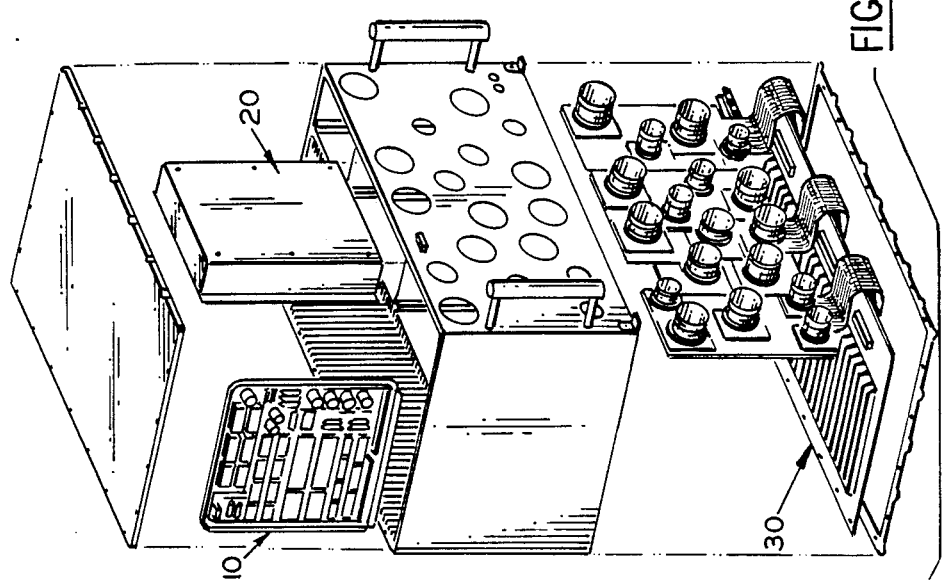
FIG.11

X-WING FLY-BY-WIRE VEHICLE MANAGEMENT SYSTEM

The invention described herein was made in the performance of work under NASA Contract No. NAS2-11771 and is subject to the provisions of Section 305 of the National Aeronautics and Space Act of 1958 (72 Stat. 435; 42 U.S. C. 2457).

CROSS REFERENCE TO RELATED APPLICATIONS

This application relates to some of the same subject matter as the following two applications, both of which were filed concurrently with this application and the disclosures of which are incorporated herein by reference.

Ser. No. 256,937 entitled "Control Law System for X-Wing Aircraft" by Thomas H. Lawrence and Phillip J. Gold; and Ser. No. 257,473 entitled "Higher Harmonic Control System for X-Wing Aircraft" by William C. Fischer and Kenneth C. Arifian.

TECHNICAL FIELD

This invention relates to "X-Wing" aircraft and more particularly to a computer based flight control system for such an aircraft. Still more particularly the present invention is directed to an overall vehicle management system for an "X-Wing" type of aircraft using a digital "fly-by-wire" (FBW) approach.

BACKGROUND ART

An X-Wing aircraft is a rotary wing aircraft that uses a rigid rotor/wing utilizing circulation control airfoils. The rotor is driven mechanically, and the rotor blades operate essentially in fixed pitch. The rotor may rotate, as in a helicopter, or it may be stopped and positioned so as to act like a fixed wing.

Collective and cyclic control is achieved by control of air circulation about a Coanda surface on the blade airfoils. This is done by blowing compressed air through leading edge and trailing edge ducts in the rotor blades and modulating the amount of air being ejected through span-wise slots on the leading and trailing edges of the rotor blades.

The rotor system for an X-Wing aircraft includes a hub and attached rotor blades and a pneumatic system for delivering pressurized air separately to the leading edge and the trailing edge of the individual rotor blades at a desired pressure and mass flow. The pneumatic system includes a compressor, a stationary air supply chamber, valving for controlling the flow of air from the chamber to the blades, and a rotating air distribution arrangement for conducting air separately to the leading edge and trailing edge of the blades.

In circulation control airfoils, pressurized air is ejected from span-wise openings or slots along the upper side of the rounded airfoil leading/trailing edge Coanda surface. The airflow from the slots attaches to the rounded leading/trailing edge, which increases the circulation, to provide a corresponding lift increase compared to an airfoil having no ejected air. For a given blade internal pressure and aerodynamic condition, the lift change due to circulation control is proportional to the area of the slot opening up to a certain limit. When the slot opening exceeds this limit, no additional lift is achieved, a condition analogous to a stall in a conventional airfoil.

Since an X-Wing circulation control airfoil is symmetrical about its half chord, the leading edge on the advancing side of the blade path disk becomes the trailing edge on the retreating side, and vice-versa. To maximize performance as the rotor slows down, it is desirable that the "local" leading edge slot be closed at all azimuth positions.

Conventional helicopters provide aircraft pitch and roll control by varying blade pitch from medium-to-high, or medium-to-low to medium at a once "per rev" (rotor revolution) rate, as the blades whirl around the rotor disk. The X-Wing aircraft includes 1-per-rev pneumodynamic control and also has more rapid pneumodynamic control variance, up to a 5-per-rev rate, to reduce system vibrations.

The X-Wing aircraft is designed to hover like a helicopter and cruise at an airplane's high speeds. It uses a stoppable rotor/wing, which, as noted, rotates like a helicopter rotor in low speed flight and stops to become a fixed wing for high speed cruise. It offers an excellent compromise for vertical take-off or landing (VTOL) hover/cruise capabilities, horsepower/fuel efficiency and ultimate payload capacity.

It achieves rotor control via a pneumatic medium controlled by a full authority fly-by-wire (FBW) system with, for example, quadruple redundancy for all flight critical functions.

Some exemplary X-Wing related patents, all owned by the assignee hereof, are listed below:

| Patent No. | Patentee(s) | Issue Date | Title |
| --- | --- | --- | --- |
| 4,493,612 | D'Anna | 01/15/85 | "Axially Slideable Plenum for Circulation Control Aircraft" |
| 4,507,050 | Jeffery et al | 03/26/85 | "Pneumatic Valve Control for Circulation Control Aircraft" |
| 4,534,702 | Johnson et al | 08/13/85 | "Pneumatic Control Valve Actuator Computer Control Arrangement" |
| 4,573,871 | Krauss et al | 03/04/86 | "X-Wing Aircraft Circulation Control" |
| 4,583,704 | Krauss et al | 04/22/86 | "Pneumatic System Structure for Circulation Control Aircraft" |
| 4,594,537 | Arifian et al | 06/10/86 | "Redundant Control System for X-Wing Valve Actuators" |
| 4,596,512 | Krauss | 06/24/512 | "Circulation Controlled Rotor Blade Tip Vent Valve" |
| 4,626,171 | Carter et al | 12/02/86 | "Rotor Blade Construction for Circulation Control Aircraft" |
| 4,678,401 | Bradford et al | 07/07/87 | "Rotor Control System" |

With respect to computer control systems, and more particularly to fail-operational, fail-safe multi-computer control systems, also note, for example, 4,270,168 of Murphy et al issued 05/26/81 entitled "Selective Disablement in Fail-Operational, Fail-Safe Multi-Computer Control System" and 4,294,162 of Fowler et al issued 10/13/81 entitled "Force Feel Actuator Fault Detection with Directional Threshold," both owned by the assignee hereof. Also, with respect to helicopter automatic flight control systems, and more particularly to limiting the collective pitch command of the automatic flight control system, see assignee's 4,564,908 of Cleford et al issued 01/14/86 entitled "Automatic Limiting of Helicopter Engine Torque."

A revolutionary concept such as "X-Wing" requires innovative approaches to service the technology leap involved in this type of hybrid aircraft.

The flight control system is one area of such a vehicle which faces significant challenges. The flight control system must not only serve the usual or traditional flight control function of a typical fixed wing aircraft or, separately, of a helicopter, but instead in one system must manage the equivalent of three vehicles, since the X-Wing operates in a rotary wing mode (RW), a fixed wing or stopped rotor mode (SR), and a conversion state (CV) between the two. In particular, there is a need for an overall vehicle management system using fly-by-wire technology to control and manage the complexity of such an aircraft.

DISCLOSURE OF INVENTION

The X-Wing control system of the present invention includes a complete vehicle management system (VMS), controlling many subsystems and providing functions well beyond the classical aircraft flight control system. The vehicle management system of the present invention receives input signals from a multiplicity of sensors and provides commands to a large number of actuators controlling many subsystems.

The general approach of the preferred VMS of the present invention includes:
- segregating flight critical and mission critical factors and providing the former with a greater degree of back-up redundancy;
- centralizing the computation of functions utilized by several subsystems (e.g. air data, rotor speed, etc.) in contrast to using distributed processing;
- integrating the control of the flight control functions, the pneumatic/compressor control, the rotor conversion control, rotor vibration alleviation, engine power anticipation, and self-test to be under the control of a single integrated flight control computer system all contained within the same hardware unit;
- preferably using equivalent redundancy techniques to attain the effect of quadruple redundancy without requiring quadruplex implementation of each device (sensor, actuator);
- including alternate modes of operation and recovery means to back-up any function(s) which fail; and
- using back-up control software (BUCS) for software redundancy.

Being contained within the same hardware unit would typically mean that the control computer system components are either on the same circuit board or are on different circuit boards sharing the same buss or with the same controllers. Likewise, typically they would be included all within the same enclosure unit or housing. This provides greater reliability and simpler interfacing in view of the data and results sharing between functional computations.

The resultant vehicle management system (VMS) is without parallel in the aircraft or helicopter industry. With its multiplicity of actuators and number of subsystems managed, it achieves a complexity second only, it is believed, to the current space shuttle. Yet, the system of the invention is highly reliable and extremely functional.

Although a four bladed rotor forming a true "X" shape is preferred, the present invention is potentially applicable to other multi-blade rotor configurations having at least two blades, including additionally, for further examples, three blades or six blades.

The foregoing and other features and advantages of the present invention will become more apparent from the following further description and drawings.

BRIEF DESCRIPTION OF DRAWINGS

FIGS. 1A, 1B & 1C are similar plan views of a typical X-Wing aircraft illustrating the three flight modes (RW, CV & SR), respectively, and the particular combinations of the rotor blade edge blowings which occur in these modes.

FIG. 5 is a generalized, schematic, block diagram showing the various mechanical and electrical interconnections and the flow of the electrical control and the data signals for the vehicle management system, including the flight control computer FCC; while

FIG. 11 includes a perspective, exploded view of the exemplary hardware and simplified, block diagrams of the architecture for the flight control computer used in the exemplary vehicle management system of the present invention.

BEST MODE FOR CARRYING OUT THE INVENTION

The Vehicle

The X-Wing aircraft is a flight vehicle, which hovers and yet has the potential to achieve speeds in excess of, for example, four hundred (400) knots when in the fixed wing (stopped rotor) configuration. It achieves this capability with a very rigid, preferably four bladed rotor, which, when stopped (SR), becomes a wing and gives it its X-Wing name. Control of both the rotor and wing is effected via circulation control airfoils, supplemented by collective pitch. Additionally, as noted above, there is a conversion mode (CV) between RW & SR.

The three modes and the particular combinations of the edge blowings are illustrated in FIGS. 1A-C. In the rotary wing (RW) mode of FIG. 1A all four blades B blow from their aerodynamic trailing edge (TEB), with the rotor rotating in a counter-clock direction, as indicated by the directional arrow. In the fixed wing mode (SR) of FIG. 1C, trailing edge blowing TEB occurs on the right side "wings," while blade leading edge blowing (LEB) occurs on the left side "wings".

In the intermediate conversion (CV) mode of FIG. 1B, the retreating side is controlled by mixed blowing. In this mode trailing edge (TEB), leading edge (LEB) and dual (DEB) blowing are all used as a function of azimuth position. This is dictated by the relative air flow over the blade B, as explained in greater detail in the copending application entitled "Control Law System for X-Wing Aircraft" referred to above.

Figure 2:
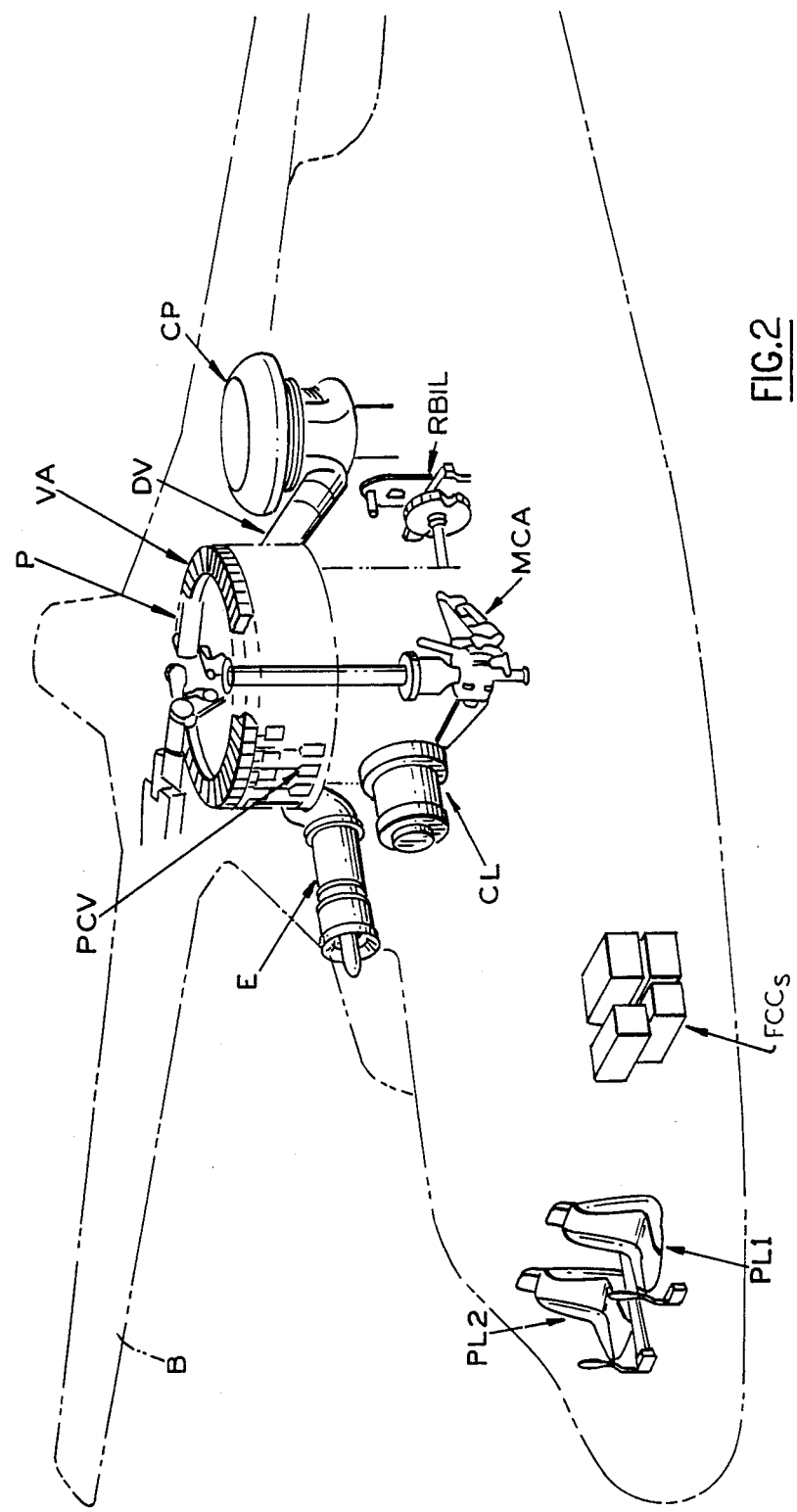
FIG. 2 is a perspective, side view of a prototype X-Wing aircraft (of a slightly different configuration than that of FIG. 1) showing the general arrangement of the various mechanical components of the aircraft, which are involved in the vehicle management system of the present invention, with the outline of the aircraft being shown in phantom line.

The compressed air generation and distribution control system for the circulation control rotor is a very unique feature of the X-Wing. The various elements of this system, as well as one possible location configuration of the other mechanical components, are illustrated in FIG. 2, with close-up detail of the pneumatic distribution system being shown in FIG. 3. It is noted that the aircraft configurations of the X-Wing aircraft of FIGS. 1 & 2 are slightly different, with the latter being based on NASA's Rotor Systems Research Aircraft (RSRA), in comparison to the more "pure" X-Wing configuration of FIG. 1.

The pneumatic distribution system controls air flow to the leading and trailing edges of the four blades B via, for example, eight receiver ducts D sampling the flow established by the opening of valves V arrayed about a stationary plenum P.

There are, for example, twenty-four valves V in each of two levels of the plenum P, each spanning a fifteen degree (15°) segment. The valves V establish a standing flow/pressure pattern around the azimuth, which is sampled by the receiver ducts D as they rotate. The receiver ducts D are, for example, thirty degrees (30°) wide, thereby simultaneously sampling two valves' width of air signals. The air is then routed through ducts running span-wise along the forward and rear edges of the blade to edge slots in the blades.

The blade slots open at a blade root pressure level of, for example, one and three-tenths (1.3) atmospheres and exhibit control approximately proportional to the air flow to, for example, about two and four-tenths (2.4) atmospheres. A slot pre-load is included to avoid undesired aerodynamic leading edge opening, when blade external pressure decreases as speed and altitude increases, which would reduce the aerodynamic efficiency of the blade.

Further, exemplary structural details of the pneumatic distribution system for an X-Wing aircraft are disclosed in U.S. Pat. No. 4,507,050 of Jeffery & Lawrence entitled "Pneumatic Valve Control for Circulation Control Aircraft" cited above, as well as in the cited '612, '871, '704 and '171 patents.

The Vehicle Management System

As will be explained more fully below, the X-Wing vehicle creates a demand upon the control system to provide, inter alia, the following major functions:

- control of the circulation control rotor (CCR) with its four blades B with a pneumatic medium and an authority dependency between control axes;
- main rotor collective pitch control;
- rotor state control for conversion acceleration, deceleration, and positioning;
- compressed air generation and distribution control from the compressor CP (note FIGS. 2 & 5) to the blade slots;
- vibration alleviation of the rotor via, preferably, higher harmonic control (HHC);
- air and other data computation; and
- system self-test.

As detailed below, the vehicle management system (VMS) of the present invention preferably segregates the flight critical and the mission critical factors, providing greater redundancy levels for the former, centralizes the computations of functions utilized by a number of subsystems (including for example air data, rotor speed, etc.) and integrates all of the flight control functions with the compressor control, conversion control, vibration alleviation, engine power anticipation and self-test, all within the same hardware unit. In engine power anticipation, the system alerts the engine to forthcoming power increase demands. Additionally, the VMS of the invention preferably uses equivalent redundancy techniques to effectively attain "quad equivalent" redundancy levels, with alternate modes of operation and recovery means to backup any flight critical function(s) which might fail. Finally, backup control software (BUCS) is used for software redundancy.

Figure 4:
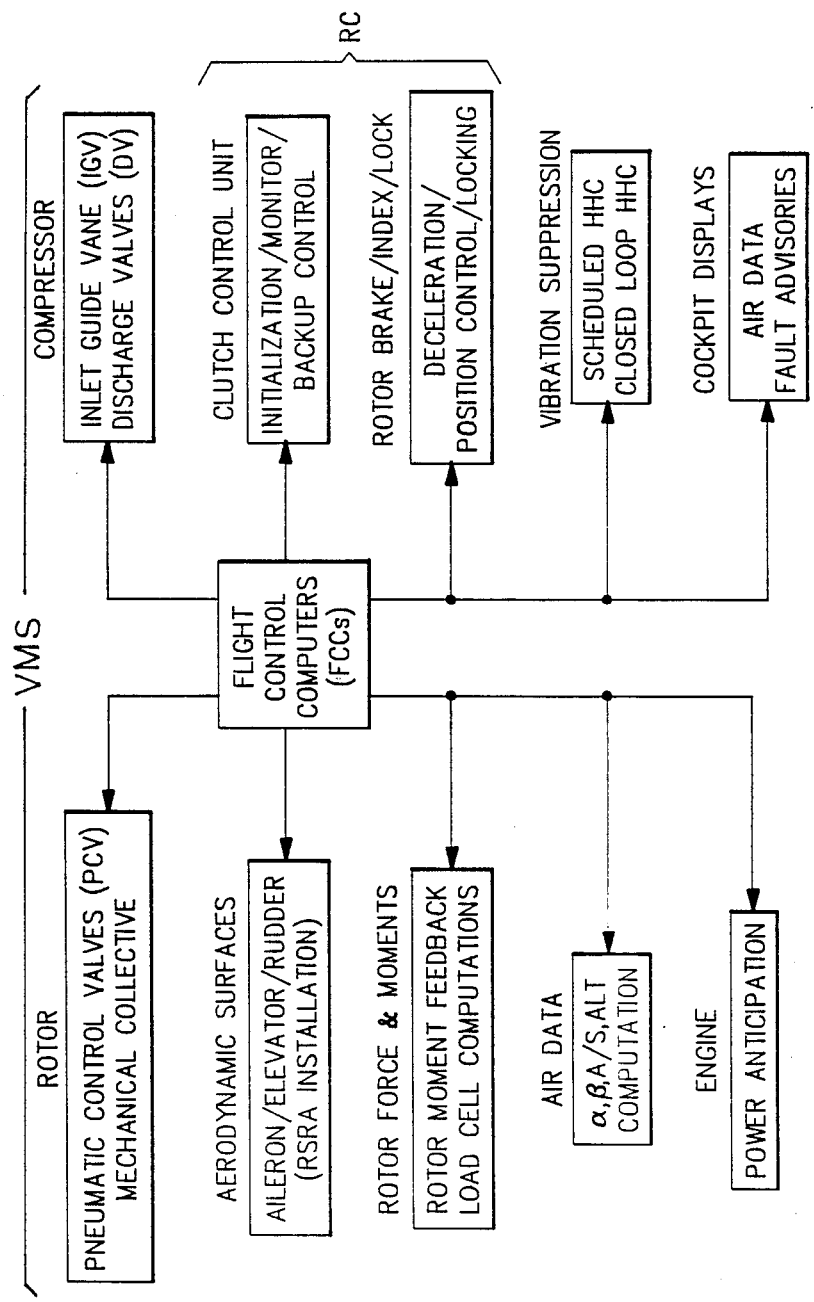
FIG. 4 is a simplified, block diagram illustrating the major vehicle management subsystems of the present invention.
Figure 5:
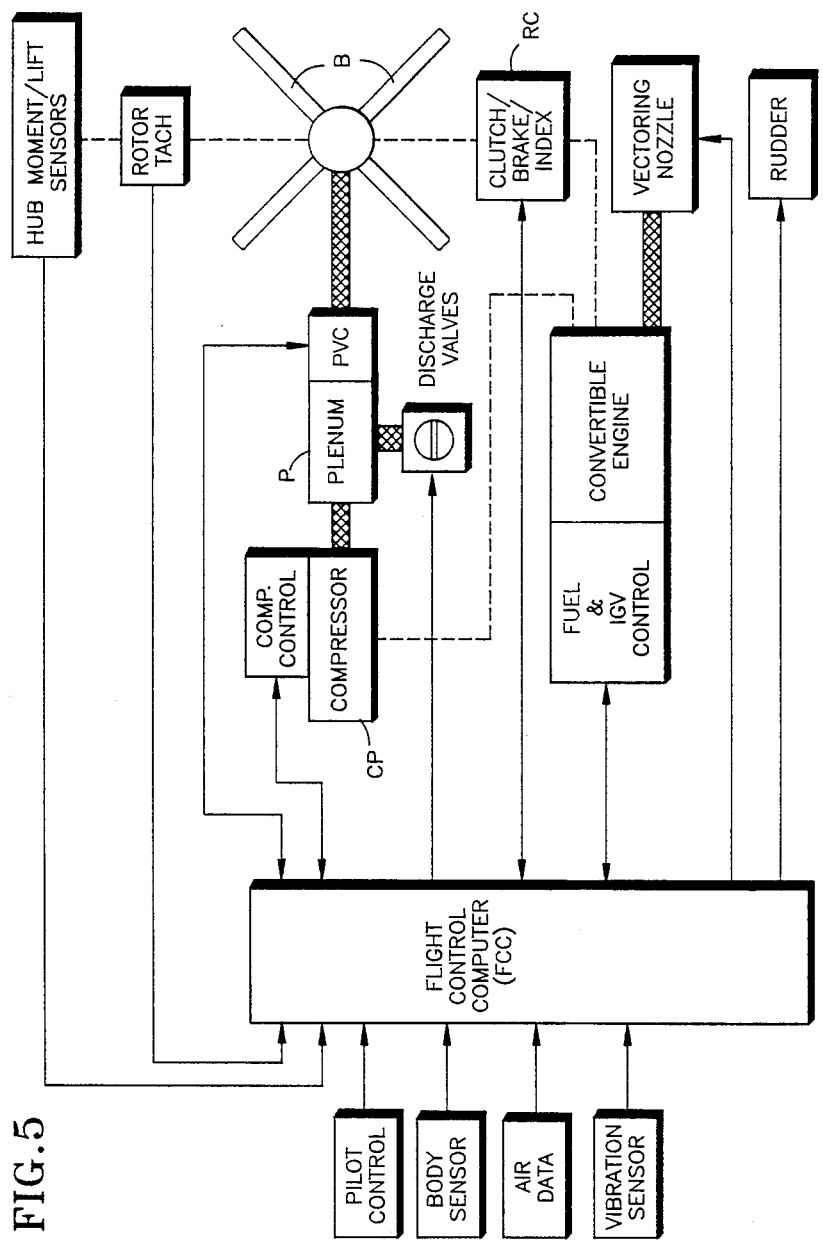
Figure 5A:
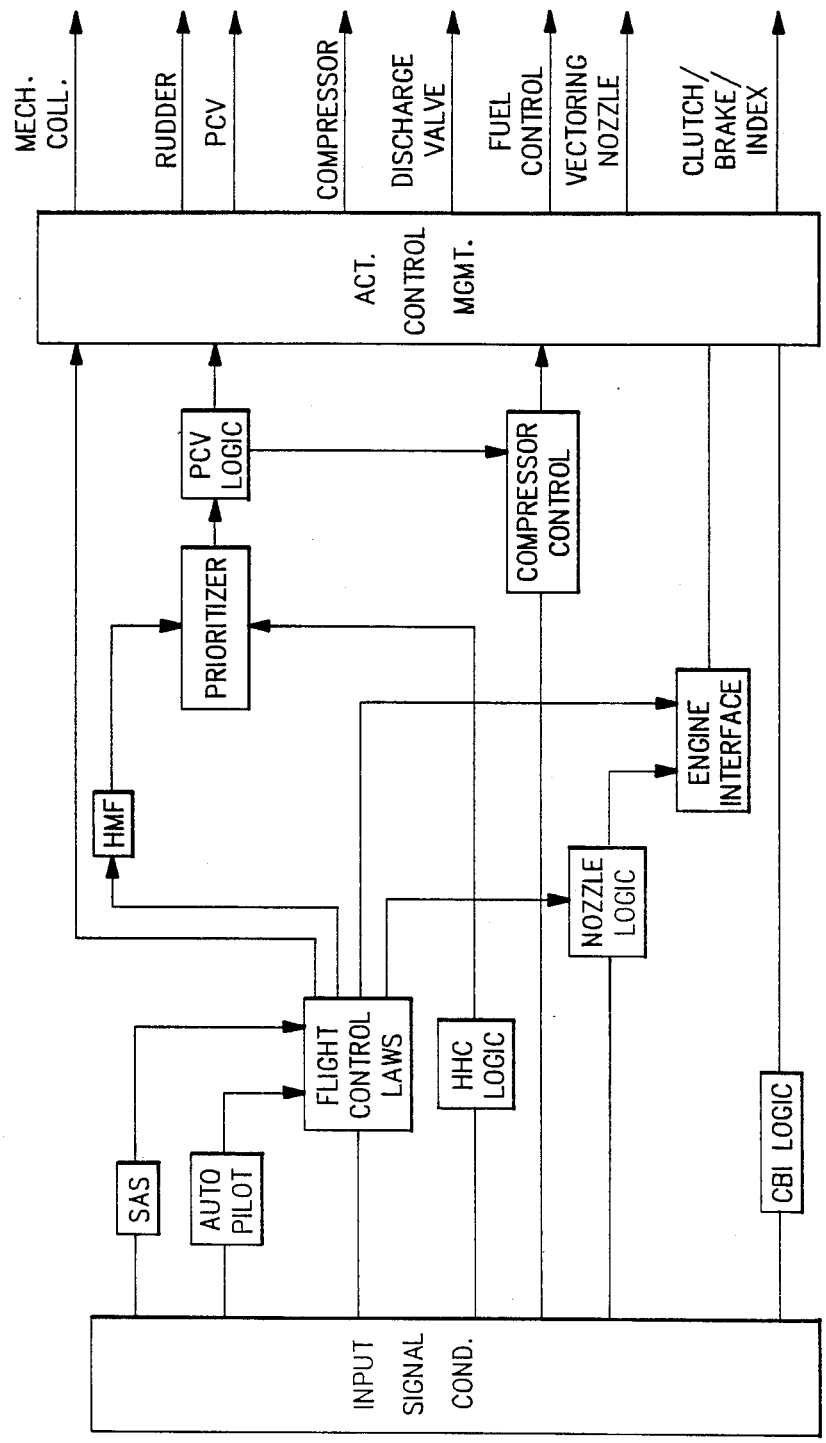
FIG. 5A is a block diagram for the various integrated components of the flight control computer of the vehicle management system of the present invention.

The major vehicle management subsystems of the present invention are illustrated in simplified, logic block form, representing their respective signal processors, in FIG. 4. The mechanical and electrical interconnections and electrical signal flow for the system, including the flight control computer FCC, are schematically illustrated in FIG. 5; while the logic block diagram for the integrated components of the FCC for the preferred VMS system is illustrated in FIG. 5A.

The control approach of the VMS includes the elements of—an integrated vehicle management system, full redundancy treatment for the X-Wing control portions, and a digital fly-by-wire approach.

Differing degrees of innovation are represented in the present invention. Although off-the-shelf components are always desirable, the unique challenges of the X-Wing, combined with the desire to maintain development flexibility, resulted in innovative designs in several areas.

As can be seen in FIG. 4, at the heart of the system are the quadruple redundant flight control computers (FCCs). Major subsystems include the pneumatic control of the rotor, which includes collective, longitudinal and lateral, and HHC blowing effected through control of the pneumatic control valves (PVC), all graphically illustrated in the upper left and lower right blocks under the block titles "rotor" and "vibration suppression," respectively. Rotor conversion (RC) is controlled by the clutch, brakes, indexer and locks (CBIL) illustrated in the right blocks of the simplified block diagram, labeled "clutch control unit" and "rotor brake/index/lock." It should be understood that the rotor conversion subsystem RC controls both the steady states (rotary and stopped) of the rotor and the conversion (CV) between those states, with the latter being achieved via the clutch CL (FIG. 2) or the rotor brake/indexing/locking assembly RBIL (FIG. 2) functions for the rotary and stopped conversions, respectively. The rotor conversion subsystem is schematically illustrated in some detail in FIG. 6.

Another subsystem of pneumatic control provides compressor control. It includes inlet guide vane (IGV) positioning to provide the proper plenum pressure, both for control and efficient operation, and modulating discharge valves DV to avoid compressor stall; as well as the pneumatic control valve actuators to establish the airflow to each blade's leading and trailing edges previously mentioned with respect to the upper left block. Other subsystems include the calculation of air data (airspeed, altitude, angle of attack, and sideslip) and rotor force and moments, all used in the control laws.

Figure 7:
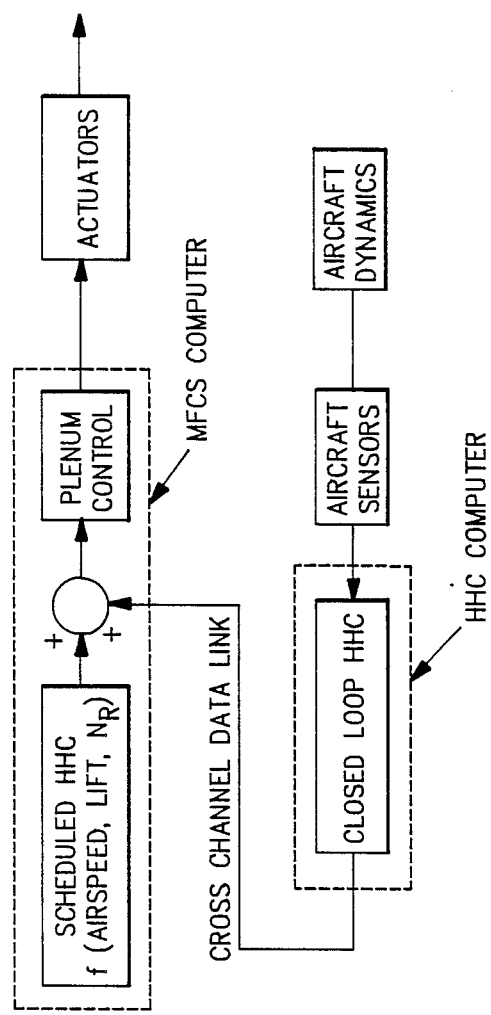
FIG. 7 is a simplified, logic block diagram illustrating the implementation of the higher harmonic control subsystem used as part of the vehicle management system of the present invention.

Vibration alleviation is provided by the HHC system, which is implemented in two forms, as can be seen in FIG. 7. These two forms include a scheduled system resident in the flight critical portion of the VMS in the manual flight control system (MFCS), and a closed loop active HHC resident in the HHC portion of two FCCs, as shown in FIG. 11, and configured as a dual (fail safe) function, with a cross channel data link between them for communication with the MFCS. Thus, the scheduled HHC is in the MFCS, while active HHC is computed in the HHC section and the results sent to the MFCS for addition to the scheduled HHC commands.

The mechanical collective pitch subsystem can include, for example, a quad electrically controlled, dual hydraulic powered system providing a range of, for example, minus six degrees ($-6°$) to plus ten degrees ($+10°$) with a ten degree ($10°$) per second slew rate operating against the very formidable loads of the rigid rotor. The mechanical collective actuator (MCA) is likewise generally shown in FIG. 2.

For further details and information on the HHC architectural aspects of the system, reference is had to the co-pending patent application entitled "Higher Harmonic Control System for X-Wing Aircraft" referred to above.

Quadruple redundancy is preferably selected for all flight critical functions based upon a two-failure operational requirement and the quantitative impact of the extensive sensor/actuator complement on reliability. Digital computation is the preferred choice, both to service the high computational demand for the VMS and for its powerful diagnostic and fault identification capability, thereby providing high fault coverage.

A stationary location of the mechanical collective actuator MCA (note FIG. 2) provides flexibility and avoids, for example, extensive power and signal transfers across slip rings. Hydraulic actuators are preferred, rather than electrical actuators, whose power demand could exceed typical vehicle installed power, or pneumatic, which by virtue of its prime control media role has low and variable pressure levels.

A primarily centralized architecture provides efficiencies and avoids relative timing permutations during system validation. Analog actuator loop closures minimize time delay and maintain stability invariant with software rearrangement. Synchronous operation permits, inter alia, more predictable and tighter detection thresholds.

SubSystems

Rotor Control: The flight control laws are structured in recognition of the unique X-Wing environment. The multiple flight modes (rotary, fixed wing & conversion) and the airspeed envelope are addressed by the phasing of many gains and functions with airspeed and rotor RPM. The sensitivity, power, and coupling of the rigid rotor are treated by multiple feedbacks, including rotor moments, attitudes, rates and extensive cross coupling of commands.

The dependency of cyclic and HHC control ranges upon collective blowing preferably is treated by the use of collective pitch for dynamic inputs and a prioritizer (note FIG. 5A) in the pneumatic control valve (PCV) algorithms. The mechanical collective functions to supplement pneumatic collective, in hovering flight, and acts to increase lateral control power, when in high speed rotary wing and stopped rotor flight.

The control law system aspects of the system are described in greater detail in the co-pending application entitled "Control Law System for X-Wing Aircraft" referred to above.

The control laws are of a "unified" form with RW, SR and CV mode laws merged into one set. A prime motivation for this is the reduction of the computer throughput demand by computing only one set of control laws, particularly during the already computationally intense conversion phase.

The higher harmonic control (HHC) system addresses the vibration which typifies a very rigid rotor. As noted above with respect to FIG. 7, the HHC is implemented in two ways. A scheduled HHC is located within the quadruple redundant portion of the flight control computers FCCs. As explained in greater detail in the cited co-pending application, this uses look-up maps for the second through fifth harmonic coefficients of the control equation as a function of airspeed, lift and rotor speed, and the rotor speed for conversion operation. These are added to the collective and cyclic terms in the control equation and implemented through the pneumatic control valve (PCV) actuators.

This flight critical portion of the HHC maintains vibration loads within structural limits. An active HHC, implemented in a dual redundant configuration, is added primarily to enhance vibration control during maneuver conditions and during conversions. It monitors vibrations at selected locations and in selected axes of the vehicle and generates corrective factors which are added to the scheduled coefficients. The active HHC represents a significant computational burden and therefore is preferably implemented in a separate dual processor computer section, complete with its own input/output signal processing, but still integrated to be physically located within two of the flight control computers (FCCs).

Figure 6:
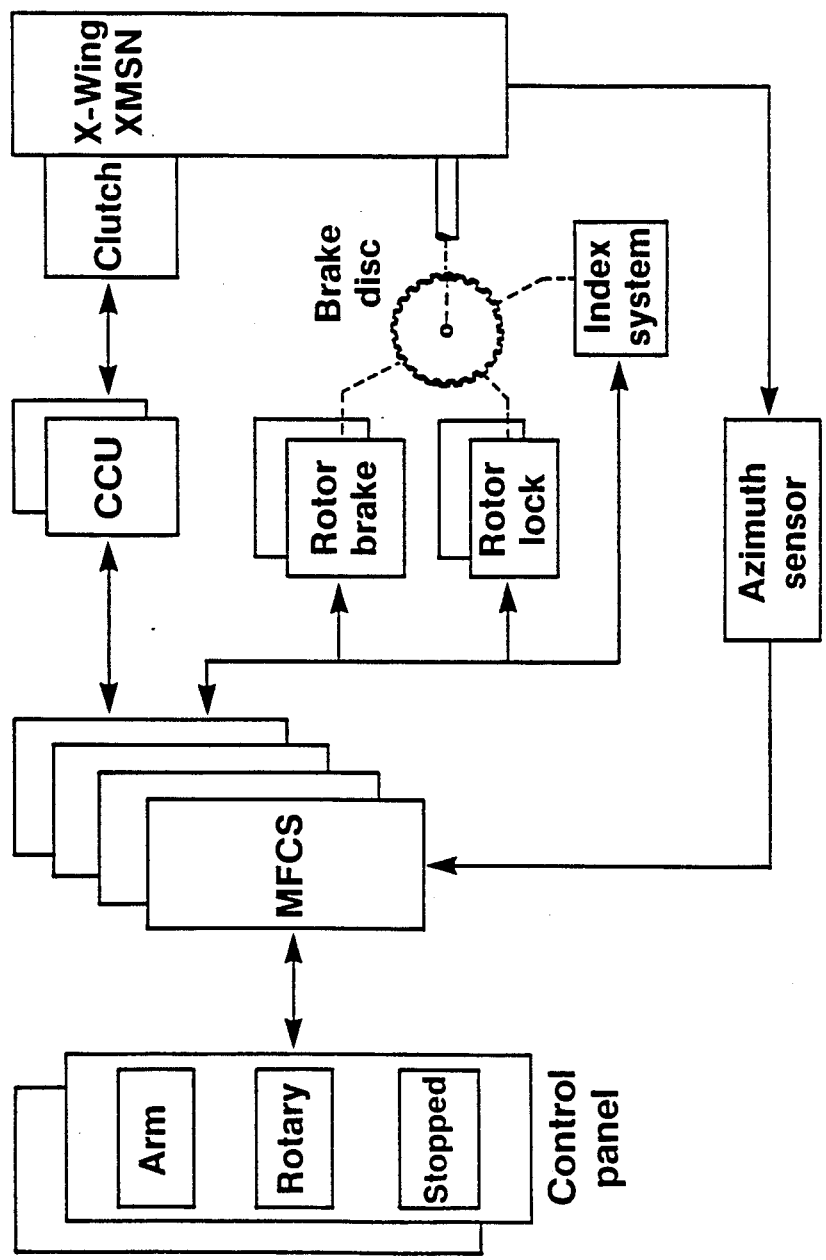
FIG. 6 is a simplified, block diagram illustrating the rotor conversion control subsystem used as part of the vehicle management system of the present invention.

The rotor conversion (RC) system is activated by either pilot activating an arming switch (ARM) on the conversion control panel in the cockpit, generally illustrated in FIG. 6. This initiates a self-test, which assesses whether the required sensors and actuators are operational to effect a conversion to the opposite state. The pilot is automatically advised of any degradation and has the prerogative to override the inhibit and do a conversion with lesser operational redundancy. Certain detected faults, which absolutely preclude a conversion, are not over-ridable; such as, for example, the loss of both brakes when desiring a conversion to a stopped rotor. The ARM puts the system in a readiness state, with the next step being the conversion mode to change to the opposite state.

A conversion is then selected, such as, for example, to stopped rotor. The clutch (CL),de-couples and goes to a passive state. The brakes are modulated to bring the rotor to a stop in, for example, approximately thirty (30) seconds. The deceleration profile preferably is nonlinear, with a more rapid rate when crossing over the blade's resonant frequencies. During the last rotation, a computation is activated to predict the final stopping point. That usually positions the rotor with its blades positioned within a few degrees of, for example, forty-five degrees (45°); that is, in the rotor position shown in FIG. 1C.

To allow for a transient at the last moment, such as for example a wind gust, an indexer preferably is included to provide fine adjustment in either direction. Alternatively, the clutch can be engaged lightly to drag the rotor to the next forty degree (45°) position. The system thus provides, in toto, several functional redundancies. Locks then maintain the stopped position of the rotor.

The compressor control is another unique aspect of the X-Wing. The computation is accomplished in the quadruple FCCs, which control the inlet guide vane (IGV) and two modulating discharge valves (MDV) through actuator control modules. The IGV primarily controls mass flow, and the MDVs establish the plenum pressure by modulating the system impedance. Operating conditions exist where a high pressure/low flow demand requires air to be dumped overboard via the MDVs (note "discharge valves" of FIG. 5).

The control system of the VMS also performs stall avoidance and stall recovery functions for the compressor. This is achieved through sensing of the condition and then providing automatic, phased corrective actions.

Redundancy

A major portion of a fly-by-wire control system design, such as that used in the VMS, must address redundancy. Key to any successful fly-by-wire system design is the proper balance between sufficient redundancy, to achieve required system flight safety reliability, and undue complexity, which would compromise system availability, weight, size and cost.

The VMS of the invention has the same objectives as most such endeavors—positive fault identification free of false alarms. System redundancy is predicated upon the design goals of preferably two-fail operational for similar failures in flight critical systems and fail-safe for "mission" critical elements.

Figure 8:
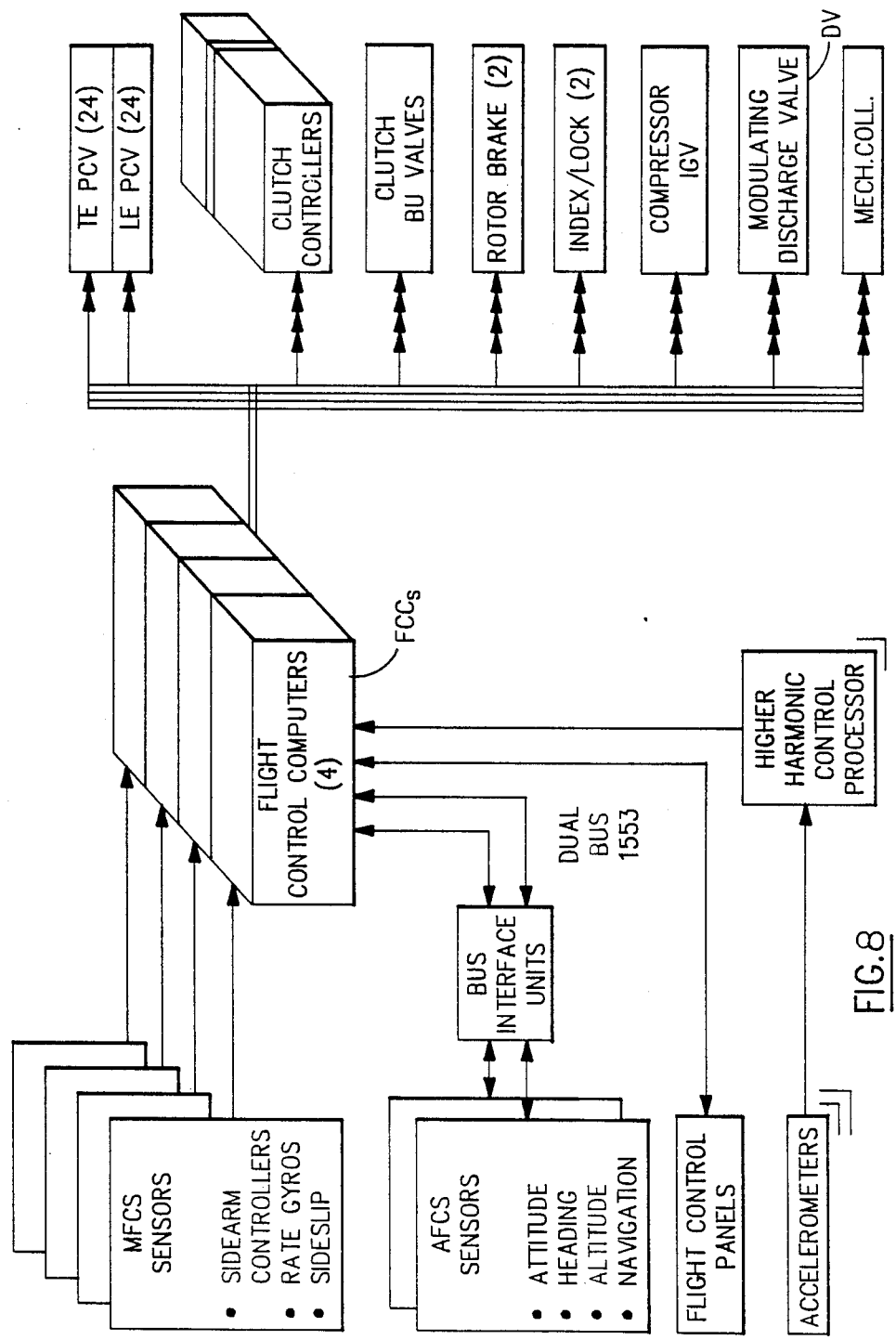
FIG. 8 is a simplified, block diagram generally illustrating the hardware redundancy approach, including quadruple redundancy for flight critical functions, used as part of the vehicle management system of the present invention.

The preferred architectural implementation is basically quadruple electrical and dual hydraulic. Elements such as the computers, sensors, and electrohydraulic servo valves preferably are quadruple, all as generally illustrated in FIG. 8.

In some areas equivalent redundancy has been achieved by structuring the system to take advantage of existing hardware or by the unique features of a subsystem.

The clutch control system is an example of the former, where dual clutch control units (CCUs) are supplemented by the quad flight control computers (FCCs), which provide independent monitoring, selection, and backup control.

The PCVs illustrate the latter. Features such as twenty-four valves (V) about the perimeter sampled two at a time by the blade receivers are supplemented by averaging springs to position a bypassed actuator at a position midway between its neighbors. The combination of these permit the PCV actuator to be configured with only dual electrical coil servo valves which permits a significant reduction in computer hardware and aircraft wiring compared to a pure quadruplex implementation.

Exemplary averaging spring structures and their ancillary components are described in the above cited U.S. Pat. No. 4,507,050. Exemplary redundant control circuitry for use with such averaging spring structures is described in the U.S. Pat. No. 4,594,537.

Mission elements, such as, for example, the automatic flight control system (AFCS) for automated modes of flight path control and its associated "1553" interface to a modern avionic suite for navigation and flight path information, are dual in their redundancy. With the flight critical elements or factors, having, for example, quadruple redundancy, it can be seen that the mission elements or factors have a lesser level of redundancy. Two types of critical factors are separately considered and segregated, with greater back-up or redundancy being provided for the flight critical factors. The active HHC is dual computationally with triplex sensors provided to enhance system reliability by an extra level of redundancy in this lesser reliability element.

Although the overall flight reliability touches on all vehicle elements, the control system design of the VMS focuses upon the three areas of prime power, hardware, and software redundancy.

Figure 9:
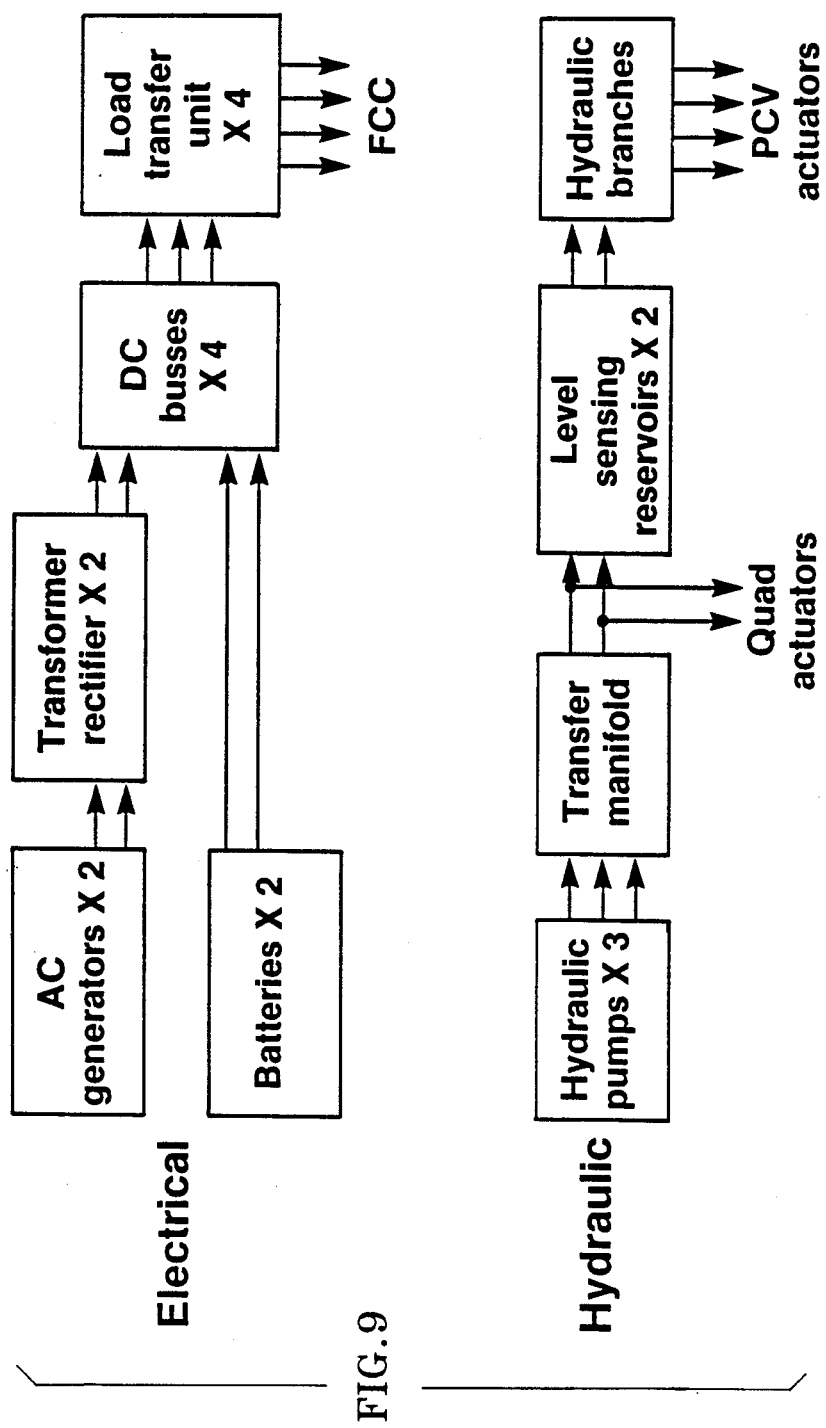
FIG. 9 is a simplified, block diagram illustrating the power redundancy aspects of the vehicle management system of the present invention.

As generally illustrated in FIG. 9, electrical power is provided by, for example, two generators and two batteries powering four electrical power distribution busses. The flight control computers FCCs interface with this power through four load transfer units (LTU), one for each FCC.

The LTUs are very rapid power switching devices to provide uninterrupted power to the FCC in the event of a generator or buss loss. Their switching time of, for example, three hundred (300) microseconds provides a safety factor of two, relative to the FCCs' carry-through capability attributable to the parasitic capacity in the power supply. As illustrated, only (or no more than) three busses feed each LTU to prevent a singular LTU catastrophic failure effecting all electrical power. Additional information concerning such LTUs is found in U.S. Pat. No. 4,638,175 of Bradford et al issued 01/20/87.

Also as illustrated in the bottom of FIG. 9, hydraulic power is provided by, for example, three pumps with a selection capability, so that the quadruplex actuators are supplied by two hydraulic sources. To address the propensity for leaks in the pneumatic control valve (PCV) area with its great number of lines in a relatively high vibration environment, reservoir level sensing is inserted to create four branches, as illustrated in the lower part of FIG. 9. This limits a leak to effecting only every fourth PCV, rather than every second one.

Most of the hardware redundancy is straight forward quadruple redundancy. One major deviation, as mentioned above, is the PCV.

Since there can be, for example, forty-eight (48) of these actuators (note FIGS. 2 & 3), there is a strong payback for any innovative approach permitting reduced hardware redundancy. Use of dual electrical redundancy in the PCV actuator has a domino effect beyond the savings at the PCV. The computer actuator drivers are halved, as are the signal interface and conditioning circuits, power dissipation is reduced, and significant aircraft wiring is saved.

Figure 10:
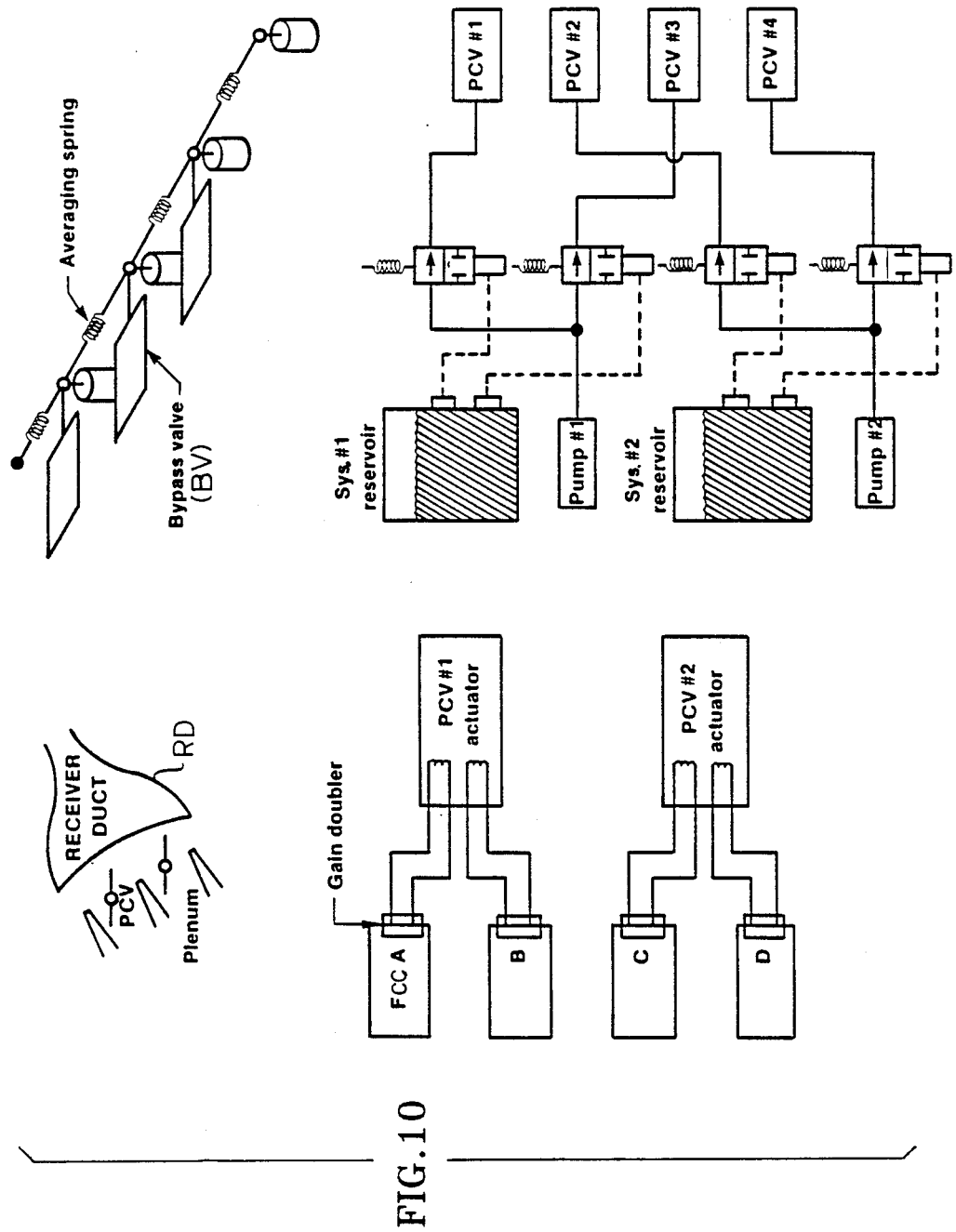
FIG. 10 includes simplified diagrams, some schematically and others in block form, generally illustrating the pneumatic control valve actuation redundancy aspects of the vehicle management system of the present invention, including its pneumatic, mechanical, electrical and hydraulic aspects.

Equivalent quadruple redundancy is achieved in the PCV in four media, as generally illustrated in FIG. 10. As is illustrated in the upper left of the figure, pneumatically each receiver duct RD spans two PCV's in width, which provides an averaging effect should a fault occur in one PCV. As generally shown in the upper right of the figure, mechanically, a ring of averaging springs connects each valve to its neighbor. Should a PCV actuator fail and be put into bypass by the computers (FCC), its associated PCV is automatically positioned at the mean of its two adjacent valves V.

Electrically there are two FCCs commanding each dual coil PCV. Should one or two FCCs fail, full control of the PCVs is retained by the others, doubling their gain to provide the same authority/response. FCCs are judiciously selected to command the PCVs to create symmetrical effects due to any FCC loss.

Of particular importance are the PCVs in the control of the rotor in its stopped position (SR). Preferably all four FCCs control the two PCVs at each blade, and similarly all four FCCs control the adjacent two PCVs, providing for control via the averaging springs in the case of a failure. Hydraulically, the above mentioned reservoir level sensing protects against the most frequent malfunction, namely, leaks.

Software redundancy is provided in two ways-selectable sub-modes of the prime software for control law and functional redundancies, and the inclusion of a second software (SW) program of limited capability. As implemented, the former might more properly be categorized as redundancy for design. One mode, termed a "direct link," provides a very simple set of rotor control laws comparable to mechanical linkages and devoid of the many feedbacks in the full control laws.

True software redundancy is addressed by the inclusion of back-up control software BUCS in recognition of the common mode software failure mode. It treats the probability that error free software may not exist, in spite of extensive verification and validation, in, for example, a hundred and twenty thousand (120,000) line computer program. The BUCS design utilizes isolated, dissimilar software located in protected memory space but executed by the same quadruple computers. It is activated by either automatic transfer, when certain failure conditions are encountered, or pilot initiated transfer. Simplicity, which equates to high confidence in software quality when subjected to extensive validation, is the essence of the BUCS.

For further information on some more of the specifics for BUCS, reference is had to commonly owned, co-pending application Ser. No. 159,483 entitled "Backup Control System (BUCS)", now U.S. Pat. No. 4,890,284 filed 02/22/88 of Murphy & Fischer and its parent application, the disclosures of which are incorporated herein by reference.

Hardware

Major hardware elements of the system include the flight control computer (FCC), the actuator control module (ACM), and the pneumatic control valve (PCV) actuator. The FCC can be, for example, a Z-8002 microprocessor-based computer with a very extensive input/output signal conditioning complement mandated by the multiplicity of system sensors and actuators.

Two major system challenges, successfully addressed in the invention, are the computational demands on the flight control computers and the magnitude of the software creation tasks. Throughput in excess of two and one-half million instructions per second ($2.5 \times 10^6$ MIPS) per channel is achieved by, for example, a lattice matrix architecture, which provides four microprocessors per channel in a parallel/co-processor configuration (note right side of FIG. 11).

Efficiencies are achieved through, for example, creation of a task driven executive and extensive use of assembly language programming. Software, for example, is treated by a structured development methodology characterized by the classical checks and culminating in verification.

Additional information is contained in the following commonly owned applications (the disclosures of which are incorporated herein by reference):

| Serial # | Filing Date | Inventor(s) | Title |
| --- | --- | --- | --- |
| 06/924,643 | 10/29/86 | Tulpule et al | "Generic Multimode Input Output Controller" abandoned |
| 06/924,647 | 10/29/86 | Tulpule et al | "Access Arbitration For An Input-Output Controller" |
| 06/924,642 | 10/29/86 | Tulpule et al | "Data Transmission Between Redundant Channels" |
| 06/914,697 | 10/02/86 | Tulpule et al | "Symmetrization For Redundant Channels" being issued as Patent 4,774,709 on 09/27/88. |

Also note commonly owned U.S. Pat. No. 4,771,427 of Tulpule et al issued 09/13/88 entitled "Equalization In Redundant Channels," whose disclosure is also incorporated herein by reference.

The complete computer set can be comprises of, for example, four boxes, all containing identical primary control and BUCS (flight critical) functions. In addition, two of the boxes preferably contain the automatic flight control system AFCS; and the other two boxes preferably contain an active HHC.

The actuator control module ACM can be, for example, the standard quadruple electrical/dual hydraulic actuator interface between the FCC and the hydraulic ram, which is be sized for the load of the specific application. It exhibits hydrologic, hydraulic shutdown interlock, and initiated built-in test (IBIT) features.

The PCV actuator preferably is a dual electrical/dual hydraulic powered actuator controlled by, for example, either of two computers. Two actuators are housed in an assembly, one for leading edge valve control and the other for trailing edge valve control via concentric shafts.

Other Exemplary Variations

Although a design goal was to structure the vehicle management system to be used as an entire system for a pure X-Wing vehicle of the type shown in FIGS. 1A–C, further refinement are, of course, possible. Some examples are presented below.

It is highly desirable from a cost, complexity, and maintenance standpoint to reduce the PCV actuator count from the present, exemplary forty-eight (48). One alternate approach is to have a distribution system to each of the eight blade circulation-control-rotor CCR surfaces with air flow controlled by high response actuators (with a frequency response capability adequate to service the HHC demands). Location in the rotating frame is indicated for both simplicity and to eliminate pneumatic compromises.

Success in that area should be paralleled by faster computational capability in the flight control computers (FCCs). Among the possibilities to increase the throughput capability of the FCCs are faster memories (which in time will become available) and the use of, for example, gate array technology for input signal processing and redundancy management, thereby off-loading these substantial tasks from the processor unit, while concurrently eliminating signal latency concerns.

Although this invention has been shown and described with respect to detailed, exemplary embodiment(s) thereof, it should be understood by those skilled in the art that various changes in form, detail, methodology and/or approach may be made without departing from the spirit and scope of this invention.

Having thus described at least one exemplary embodiment of the invention, that which is new and desired to be secured by Letters Patent is claimed below.

1. A method of providing a vehicle management computer system (VMS) for an X-Wing type aircraft controlling many mechanical subsystems and functions including flight control functions, compressor and pneumatic distribution control, rotor conversion control, rotor vibration alleviation and self-test, comprising the following steps:
   (a) segregating flight critical and mission critical factors;
   (b) centralizing the computation of functions utilized by several mechanical subsystems, including air data and rotor speed;
   (c) integrating the flight control functions, the compressor and pneumatic distribution control, the rotor conversion control, rotor vibration alleviation and self-test to be under the control of a single integrated flight control computer system contained within the same hardware unit; and
   (d) providing redundancy for the integrated computer system with multiple number of like flight control computer systems contained in separate hardware units, at least some of which likewise include the integration step of step "c," and providing multiple redundancy for backing up flight critical factors and mission critical factors, with the redundancy of the former being greater than the latter;
   wherein in step "c," in the controlling of the self-test, there is included the following step(s):
   allowing conversion of the rotor from one state to the opposite state only after a self-test is initiated, which test is initiated when a switch is activated under a pilot's manual control, and in the self-test, assessing whether the sensors and actuators required for conversion to the opposite state are operational to effect a conversion to the opposite state.

2. The method of claim 1, wherein inhibit signals are generated when certain conditions are sensed; and wherein, in conjunction with the self-test step, there is further included the following step(s):
   automatically advising the pilot of any degradation in the operation of any of the sensors and actuators, and giving the pilot the prerogative to override an inhibit signal and do a conversion with lesser operational redundancy except for certain detected faults, which absolutely preclude a conversion.

3. A method of providing a vehicle management computer system (VMS) for an X-Wing type aircraft controlling many mechanical subsystems and functions including flight control functions, compressor and pneumatic distribution control, rotor conversion control, rotor vibration alleviation and self-test, comprising the following steps:
   (a) segregating flight critical and mission critical factors;
   (b) centralizing the computation of functions utilized by several mechanical subsystems, including air data and rotor speed;
   (c) integrating the flight control functions, the compressor and pneumatic distribution control, the rotor conversion control, rotor vibration alleviation and self-test to be under the control of a single integrated flight control computer system contained within the same hardware unit; and
   (d) providing redundancy for the integrated computer system with multiple number of like flight control computer systems contained in separate hardware units, at least some of which likewise include the integration step of step "c," and providing multiple redundancy for backing up flight critical factors and mission critical factors, with the redundancy of the former being greater than the latter;
   wherein in step "c," in integrating the rotor conversion control, there is included the further step(s) of:
   also integrating the rotor conversion control in both the steady states (rotary and stopped) of the rotor and the conversion between those states, with the latter being achieved by utilizing the clutch mechanical subsystem for the stopped to rotary conversion and the rotor brake/indexing/locking mechanical subsystems for the rotary to stopped conversion, all under the control of the same single integrated flight control computer system and with the multiple redundancy of step "d".

4. A method of providing a vehicle management computer system (VMS) for an X-Wing type aircraft controlling many mechanical subsystems and functions including flight control functions, compressor and pneumatic distribution control, rotor conversion control, rotor vibration alleviation and self-test, comprising the following steps:
   (a) segregating flight critical and mission critical factors;
   (b) centralizing the computation of functions utilized by several mechanical subsystems, including air data and rotor speed;
   (c) integrating the flight control functions, the compressor and pneumatic distribution control, the rotor conversion control, rotor vibration alleviation and self-test to be under the control of a single integrated flight control computer system contained within the same hardware unit; and (d) providing redundancy for the integrated computer system with multiple number of like flight control computer systems contained in separate hardware units, at least some of which likewise include the integration step of step "c," and providing multiple redundancy for backing up flight critical factors and mission critical factors, with the redundancy of the former being greater than the latter;

wherein in step "c" there is included the following step(s):

controlling the integrated vibration alleviation by utilizing higher harmonic control (HHC) and implementing it in two forms, a scheduled system resident in the flight critical portion of the VMS and a closed loop active HHC configured in a fail safe approach.

5. The method of claim 4, wherein there is included the further step(s) of:

providing a cross channel data link between the scheduled system resident in the flight critical portion of the VMS and the closed loop active HHC configured in a fail safe approach.

6. The method of claim 4, wherein there is further included the following step(s):

implementing HHC in a separate dual processor computer section, complete with its own input/output signal processing, but still integrated to be physically located within the hardware unit of each flight control computer.

7. A method of providing a vehicle management computer system (VMS) for an X-Wing type aircraft controlling many mechanical subsystems and functions including flight control functions, compressor and pneumatic distribution control, rotor conversion control, rotor vibration alleviation, self-test and compressor control, comprising the following steps:

(a) segregating flight critical and mission critical factors;

(b) centralizing the computation of functions utilized by several mechanical subsystems, including air data and rotor speed;

(c) integrating the flight control functions, the compressor and pneumatic distribution control, the rotor conversion control, rotor vibration alleviation and self-test to be under the control of a single integrated flight control computer system contained within the same hardware unit; and (d) providing redundancy for the integrated computer system with multiple number of like flight control computer systems contained in separate hardware units, at least some of which likewise include the integration step of step "c," and providing multiple redundancy for backing up flight critical factors and mission critical factors, with the redundancy of the former being greater than the latter;

wherein in step "c," in integrating the pneumatic control, there is included the further step(s) of:

also integrating the control of the compressor, including inlet guide vane positioning to provide proper plenum pressure, and modulating discharge valves avoiding compressor stall, as well as the control of the pneumatic control valve actuators to establish the airflow to each blade's leading and trailing edges.

8. A method of providing a vehicle management computer system (VMS) for an X-Wing type aircraft controlling many mechanical subsystems and functions including flight control functions, compressor and pneumatic distribution control, rotor conversion control, rotor vibration alleviation, self-test and engine power anticipation, comprising the following steps:

(a) segregating flight critical and mission critical factors;

(b) centralizing the computation of functions utilized by several mechanical subsystems, including air data and rotor speed;

(c) integrating the flight control functions, the compressor and pneumatic distribution control, the rotor conversion control, rotor vibration alleviation and self-test to be under the control of a single integrated flight control computer system contained within the same hardware unit; and (d) providing redundancy for the integrated computer system with multiple number of like flight control computer systems contained in separate hardware units, at least some of which likewise include the integration step of step "c," and providing multiple redundancy for backing up flight critical factors and mission critical factors, with the redundancy of the former being greater than the latter;

wherein in step "c," in integrating the control of the various functions, there is included the further step(s) of:

also integrating the control of engine power anticipation within the same hardware unit.

9. A method of providing a vehicle management computer system (VMS) for an X-Wing type aircraft controlling many mechanical subsystems and functions including flight control functions, compressor and pneumatic distribution control, rotor conversion control, rotor vibration alleviation and self-test, comprising the following steps:

(a) segregating flight critical and mission critical factors;

(b) centralizing the computation of functions utilized by several mechanical subsystems, including air data and rotor speed;

(c) integrating the flight control functions, the compressor and pneumatic distribution control, the rotor conversion control, rotor vibration alleviation and self-test to be under the control of a single integrated flight control computer system contained within the same hardware unit; and (d) providing redundancy for the integrated computer system with multiple number of like flight control computer systems contained in separate hardware units, at least some of which likewise include the integration step of step "c," and providing multiple redundancy for backing up flight critical factors and mission critical factors, with the redundancy of the former being greater than the latter;

wherein in step "c," in the rotor conversion control, when the conversion is to stopped rotor, there is included the following step(s):

using a nonlinear deceleration profile in slowing down the rotor, with a more rapid deceleration rate being used when crossing over the blade's resonant frequencies.

10. A method of providing a vehicle management computer system (VMS) for an X-Wing type aircraft controlling many mechanical subsystems and functions including flight control functions, compressor and pneumatic distribution control, rotor conversion control, rotor vibration alleviation and self-test, comprising the following steps:

(a) segregating flight critical and mission critical factors;

(b) centralizing the computation of functions utilized by several mechanical subsystems, including air data and rotor speed;

(c) integrating the flight control functions, the compressor and pneumatic distribution control, the rotor conversion control, rotor vibration alleviation and self-test to be under the control of a single integrated flight control computer system contained within the same hardware unit; and (d) providing redundancy for the integrated computer system with a multiple number of like flight control computer systems contained in separate hardware units, at least some of which likewise include the integration step of step "c," and providing multiple redundancy for backing up flight critical factors and mission critical factors, with the redundancy of the former being greater than the latter.

11. The method of claim 10, wherein in step "c," in integrating the compressor and pneumatic distribution control, there is included the further step(s) of:

also integrating the compressor control, including control of inlet guide vane positioning to provide the proper plenum pressure, and of modulating discharge valves avoiding compressor stall, as well as the control of the pneumatic control valve actuators establishing the airflow to each blade's leading and trailing edges, all under the control of the same single integrated flight control computer system and with the multiple redundancy of step "d".

12. The method of claim 10, wherein in step "d" there is included the following step(s):

using equivalent redundancy techniques to attain in effect quadruplicate equivalency levels.

13. The method of claim 10, wherein in step "d" there is included the following step(s):

including alternate modes of operation and recovery means to back-up the function(s) of the mechanical subsystems, in case they should fail.

14. The method of claim 10, wherein step "d" there is further included the following step(s):

using redundancy techniques to attain quadruple redundancy at least equivalently;

including alternate modes of operation and recovery means to back-up any function(s) which fail; and using back-up control software for software redundancy.

15. The method of claim 14, wherein there is further included the following step(s):

providing in connection with the pneumatic control hydraulic reservoir level sensing creating at least four hydraulic branches.

16. In an X-Wing type aircraft having an engine and a rotor, an integrated vehicle management computer system (VMS) for controlling many mechanical subsystems and functions including the flight control functions, the compressor and pneumatic distribution controls, the rotor conversion control, rotor vibration alleviation subsystem, and self-test, comprising:

fly-by-wire means having flight controls for controlling various flight control functions of the aircraft; compressor and pneumatic distribution subsystems and controls therefor providing controlled pneumatic pressure to the edges of the rotor; a rotor control subsystem associated with the rotor and controls therefor; a rotor vibration alleviation subsystem associated with the rotor; and a self-test subsystem;

first flight control computer signal processing means connected to said fly-by-wire means for generating signals controlling in an integrated way the flight control functions, the compressor and pneumatic distribution controls, the rotor conversion control, rotor vibration alleviation subsystem, and self-test subsystem, all integrated under the control of said first flight control computer system and contained within the same hardware unit;

means for segregating flight critical and mission critical factors;

redundant flight control computer signal processing means contained within the aircraft for generating signals in addition to said first flight control computer means, each of which is contained in a separate hardware unit, and each of which are likewise generating signals integrating the control of the flight control functions, the compressor and pneumatic distribution controls, the rotor conversion control, rotor vibration alleviation subsystem, and self-test subsystem, providing multiple redundancy for backing up flight critical factors and mission critical factors, with the redundancy of the former being greater than the latter; and centralizing means associated with all of said flight control computer means for centralizing the computation of functions utilized by several mechanical subsystems, including air data and rotor speed.

17. The integrated vehicle management system of claim 16, wherein the rotor includes a number of blades, each having leading and trailing edges, and wherein said compressor and pneumatic distribution subsystem includes:

a compressor, a plenum, movable inlet guide vanes, discharge valves, and valve actuators;

said first and said redundant flight control computer means each also includes:

control signal means for generating signals controlling the compressor, including control of inlet guide vane positioning providing the proper plenum pressure and air flow, and control of said modulating discharge valves, as well as control of said pneumatic control valve actuators establishing the airflow to each rotor blade's leading and trailing edges;

control signal means for providing signals controlling rotor state in both the steady states (rotary and stopped) of the rotor and the conversion between those states, with the latter being achieved by utilizing the clutch mechanical subsystem for the conversion to rotary mode and the rotor brake/indexing/locking mechanical subsystems for the conversion to the stopped mode; and integrated vibration alleviation control means generating signals utilizing higher harmonic control (HHC) and implementing it in two forms, a scheduled system resident in the flight critical portion of the FCC and a closed loop active HHC configured in a fail safe approach, a cross channel data link being provided between said two forms of HHC.

18. The integrated vehicle management system of claim 17, wherein:
said vibration alleviation subsystem is contained in a separate dual processor computer section within each flight control computer, complete with its own input/output signal processing, but still integrated to be physically located within the same hardware unit of each said flight control computers.

19. The integrated vehicle management system of claim 16, wherein there is further included engine power anticipation subsystem means associated with the engine for alerting the engine to forthcoming power increase demands; and wherein said first flight control computer signal processing means also provides signals for said engine power anticipation subsystem, and said redundant flight control computer signal processing means also provides signals for said engine power anticipation subsystem.

20. A method of providing a vehicle management computer system (VMS) for an X-Wing type aircraft controlling many mechanical subsystems and functions including flight control functions, the compressor and pneumatic distribution control, the rotor conversion control, rotor vibration alleviation, engine power anticipation, compressor control and self-test, comprising the following steps:
(a) segregating flight critical and mission critical factors;
(b) centralizing the computation of functions utilized by several mechanical subsystems, including air data and rotor speed;
(c) integrating the flight control functions, the compressor and pneumatic distribution control, the rotor conversion control, rotor vibration alleviation, engine power anticipation and self-test to be under the control of a single integrated flight control computer system contained within the same hardware unit;
(d) providing redundancy for the integrated computer system with a multiple number of like flight control computer systems contained in separate hardware units, at least some of which likewise include the integration step of step "c," and providing multiple redundancy for backing up flight critical factors and mission critical factors, with the redundancy of the former being greater than the latter;
(e) also integrating the control of the compressor control, including control of inlet guide vane positioning to provide the proper plenum pressure, and of modulating discharge valves avoiding compressor stall, as well as the control of the pneumatic control valve actuators establishing the airflow to each blade's leading and trailing edges, all under the control of the same single integrated flight control computer system and with the multiple redundancy of step "d;" and
(f) also integrating the control of the rotor conversion control in both the steady states (rotary and stopped) of the rotor and the conversion between those states, with the latter being achieved by utilizing the clutch mechanical subsystem for the stopped to rotary conversion and the rotor brake/indexing/locking mechanical subsystems for the rotary to stopped conversion, all under the control of the same single integrated flight control computer system and with the multiple redundancy of step "d".

21. The method of claim 20, wherein in step "c," in the controlling of the self-test, there is included the following step(s):
allowing conversion of the rotor from one state to the opposite state only after a self-test is initiated, which test is initiated when a switch is activated under a pilot's manual control, and in the self-test, assessing whether the sensors and actuators required for conversion to the opposite state are operational to effect a conversion to the opposite state.

22. The method of claim 21, wherein inhibit signals are generated when certain conditions are sensed; and wherein, in conjunction with the self-test step, there is further included the following step(s):
automatically advising the pilot of any degradation in the operation of any of the sensors and actuators, and giving the pilot the prerogative to override an inhibit signal and do a conversion with lesser operational redundancy except for certain detected faults, which absolutely preclude a conversion.

* * * * *

UNITED STATES PATENT AND TRADEMARK OFFICE
CERTIFICATE OF CORRECTION

PATENT NO. : 4,965,879

DATED : October 23, 1990

INVENTOR(S) : William C. Fischer, Jr.

It is certified that error appears in the above-identified patent and that said Letters Patent is hereby corrected as shown below:

Col. 4, line 18, before the period (.) insert --, with Fig. 1A (RW) having the entire disk trailing edge blowing (TEB), Fig. 1B (CV) having the "advancing" side trailing edge blowing, the "retreating" side mixed blowing of TEB, dual & leading edge blowing (LEB), and Fig. 1C (SR) having the "advancing" side TEB and the "retreating" side LEB--.

Col. 4, line 63, before the period (.) please insert --in the upper-left, the upper-right, the lower-left & the lower-right porions, respectively, of the figure--.

Col. 4, line 65, after "hardware" please inert --(left side of figure)--.

Col. 4, line 68, before the period (.) please insert --, with the FCC architecture being illustrated in the upper-right of the figure and the quad processor of the manual control flight system (MFCS) being illustrated in the lower-right of the figure--.

Figure 3:
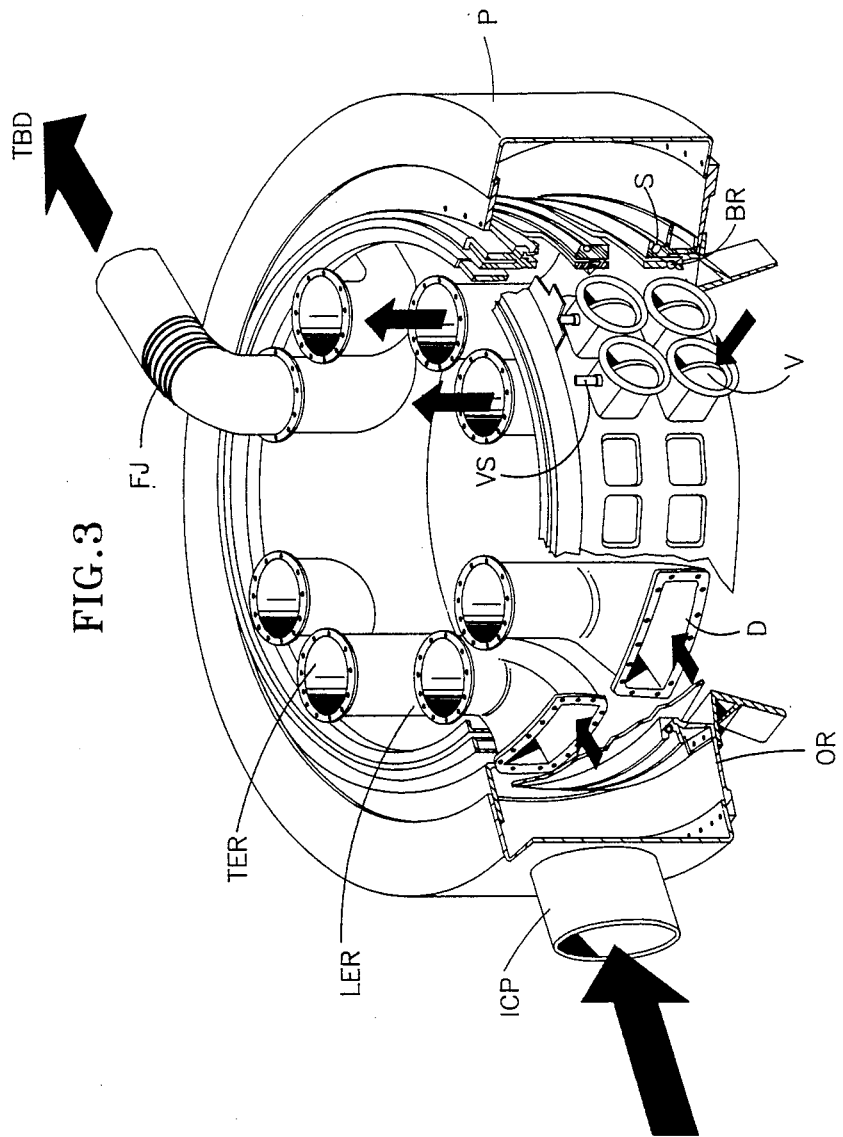
FIG. 3 is a perspective, partially cut away, more detailed view of the compressed air pneumatic distribution mechanical subsystem of the pneumatic control system, showing its various mechanical elements, for the circulation control rotor of the X-Wing aircraft.

Col. 5, line 46, please insert the following paragraph:
--In addition to the elements described more fully below, other elements of the compressed air generation and distribution control system for the circulation control rotor illustrated in Figures 2 & 3 (with the various direction arrows indicating the various directions of air flow) include the following:

UNITED STATES PATENT AND TRADEMARK OFFICE
CERTIFICATE OF CORRECTION

PATENT NO. : 4,965,879

DATED : October 23, 1990

INVENTOR(S) : William C. Fischer, Jr.

It is certified that error appears in the above-identified patent and that said Letters Patent is hereby corrected as shown below:

| Reference | Element |
|---|---|
| PL1 | pilot's seat |
| PL2 | co-pilot's seat |
| E | engine |
| VA | pneumatic control valve actuators |
| ICP | inlet from compressor (CP |
| LER | rotating leading edge receiver |
| TER | rotating trailing edge receiver |
| FJ | flex joint |
| TBD | to blade ducts |
| S | seal |
| BR | bearing |
| V | valve (with stationary valve parts being shown in Fig. 3) |
| VS | valve shaft |
| OR | opening to receiver (valves removed)--. |

Col. 7, line 31, after "resident in" please insert --in the right side portion of--.

Col. 12, line 51, after "boxes" please insert --(an exemplary one being illustrated in the left side of Figure 11)--.

Col. 12, line 50, after "be" change "comprises" to read --comprised--.

UNITED STATES PATENT AND TRADEMARK OFFICE
CERTIFICATE OF CORRECTION

PATENT NO. : 4,965,879  Page 3 of 3

DATED : October 23, 1990

INVENTOR(S) : William C. Fischer, Jr.

It is certified that error appears in the above-identified patent and that said Letters Patent is hereby corrected as shown below:

Col. 12, line 69, please insert the following paragraph:
--As can be seen in the right side of Figure 11, the exemplary hardware box includes a PC module 10 (a typical one being illustrated), a power supply module 20 (a typical one being illustrated), and an interconnect module 30. As can be seen in the lower left of Figure 11, the MFCS quad processor includes to the left of the block diagram two "processor/IOCs" and to the right two "processor/DPRs".--

Signed and Sealed this

Thirty-first Day of May, 1994

Attest:

BRUCE LEHMAN

*Attesting Officer*  *Commissioner of Patents and Trademarks*